May 23, 1939.　　　C. W. WEST　　　2,159,680

DIE AND TAP WRENCH

Filed April 25, 1938

INVENTOR.
CHARLES W. WEST
BY
ATTORNEY.

Patented May 23, 1939

2,159,680

UNITED STATES PATENT OFFICE 2,159,680

DIE AND TAP WRENCH

Charles W. West, Burlingame, Calif.

Application April 25, 1938, Serial No. 204,065

2 Claims. (Cl. 10—123)

This invention relates to taps and dies as used for cutting threads and has for its principal object an improved tap and die wrench or holder to facilitate the work of a machinist in using taps and dies.

Another object of the invention is to provide an improved form of tap and die wrench which will enable the machinist to more accurately guide the tap or die axially in the hole or rod to be threaded when using the tools entirely by hand.

Another feature is the provision of means on the wrench to cooperate with a lathe tail or head taper center for guiding the tap or die.

Another feature is the provision of means on the wrench for centering and guiding the same by a tail plate on the lathe tail stock.

Another feature is to provide for the extrusion of metal chips from the threading die into the lathe center without releasing the pressure of the center against the wrench.

Still another feature is the provision of means for nesting a plurality of the die holders so that various sizes may be stored each with a die in place for immediate use.

Other features and advantages will appear from the following description and in the accompanying drawing.

Figure 1:
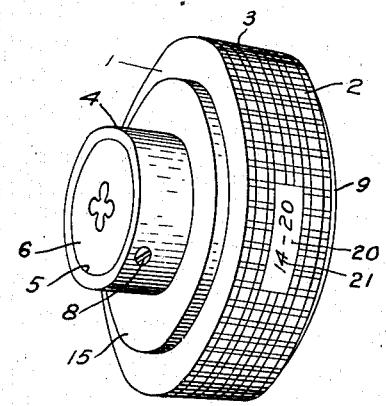
Figure 1 is a perspective view of my improved wrench with a threading die in place.

Before describing the invention in detail, my new die and tap wrench may be said to be devised to take the place of the common tap wrench and die stock which, as well known, consists of a pair of aligned handles or straight bar with a socket between the ends of the bar to secure the die or tap in place. In tapping or threading with such a tap wrench or die stock where no guides are provided as with pipe threading die stocks, great care has to be used to keep the wrench handles at right angles to the axis of the article or hole being threaded so that the thread will run true. Also when threading items on a lathe with the aid of a common tap wrench or die stock no means is provided for cooperation with the tail center or plate for centering the wrench. Also frequently the length of the wrench or stock handles interferes with the turning of the die or tap in confined position of use.

In my improved form of tap and die wrench all the disadvantages of the common tap and die wrench are overcome and several advantages added.

My improved wrench, as shown in the drawing, comprises a body 1 provided with a hand wheel or hand gripping rim 2 formed very deeply knurled or roughened on its exterior as at 3, and provided on its front side with a central hub 4 formed with a bore or socket 5 to receive a common solid or split threading die 6 which seats against an inner shoulder 7 formed in the bore. The die is held in place as by one or more set screws 8 passing through the side of the hub.

The rear side of the hand wheel 2 is formed with an axially projecting flange or bead 9 somewhat smaller than the gripping rim 2 and is hollowed out in a beveled manner as indicated at 10 to form a flat inner seat 11, and which seat is counterbored with a tapering hole as at 12 to meet the reduced size parallel bore 5' which forms the shoulder 7 for seating the die.

The flat seat 11 is for the purpose of fitting against a flat tail plate on a lathe formed of a diameter to just fit within the recess 10, and which may be similarly beveled, and the beveled or tapered hole 12 is for the purpose of fitting upon a standard lathe center, or preferably a hollow lathe center as indicated at 13 so that the rod being threaded by the die (while held in the chuck of the lathe) can pass into the tail stock bore 14, as can the metal chips also.

Figure 3:
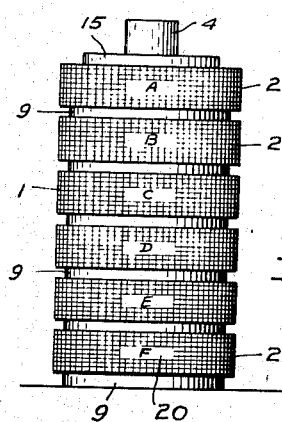
Figure 3 is a reduced size view showing a stack of my die wrenches nested and marked exteriorly for size of thread.

On the front face of the hand wheel is a circular ledge 15 of a diameter to fit freely within the rear recess 10 of another similar die holder so that several of the devices, each complete with its die in place, may be stacked or nested as indicated in Figure 3, and wherein the separate nested devices are respectively designated A to F. The depth of the recess 10 is preferably such as to entirely receive the hub 4 of an adjacent holder when nested.

Figure 4:
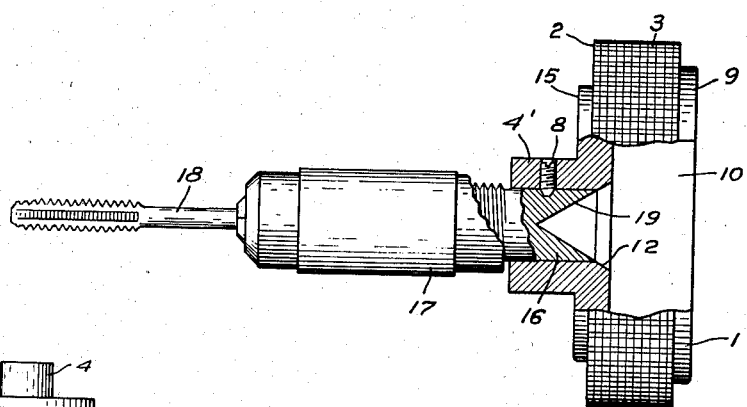
Figure 4 is a side view of my improved wrench with portion broken away showing a top chuck in place.

When the device is used as a tap wrench as shown in Figure 4, the hub 4' may be somewhat smaller in diameter than when bored to receive a die, and into the bore is snugly fitted the smooth end or shank 16 of a suitable tap chuck 17 into which the tap 18 is gripped. The shank 16 of the chuck is preferably taper-bored at its inner end as at 19 to continue the taper bore 12 of the holder so as to receive a lathe center if desired.

If round or hexagonal articles, or other shaped articles which can easily be centered in a lathe chuck are being tapped, the hand wheel wrench may be centered against the tail stock plate, or standard taper center as explained for the die holder form of the device, or in either case the flat outer edge of flange 9 may rest against a larger tail plate on the lathe and the device forced along by the tail stock either by screwing or simply pushing the same toward the work, while holding the large hand wheel 2 with one hand to prevent its turning.

The large round hand wheel provides for easily spinning the device to back out of a tapped hole or threaded rod, especially if done on a lathe, and as the outer surfaces of the knurled protuberances 3 are preferably of relatively large size as indicated in Figure 4, the device may readily be gripped and centered in a lathe chuck if desired.

While it is obvious that various size threading dies of a given outer diameter are interchangeable in the socket of the holder, it will be handier for shops doing much threading to provide a dozen or more for the generally used dies and taps, and always leave them in their holders, and to facilitate finding the proper die when several are stacked as in Figure 3, I provide a blank space 20 on the knurled rim, either flush with the outer surface of the knurling or depressed, so as to receive stamped in figures designating the size of the die as indicated at 21 in Figure 1.

While the drawing shows the device in full size as I have found most convenient in connection with the ordinary small taps and dies, and while I prefer to make the device of aluminum for lightness and proof against rusting, no limitation is to be implied thereby.

Also, while I show and prefer that the hand wheel be round and with a cylindrical exterior so that it may be more easily held in a lathe chuck if desired, the gripping rim may be hexagonal, octagonal, or otherwise formed, while still yielding some of the advantages of the invention as above set out.

The use of this device by me in practical work shows it to be outstanding in facilitating the threading and tapping of work under varied conditions, as against the common tap and die wrench and stock that I feel entitled to claim the same broadly and my use of the words "threading die" is to be taken as including a threading tap also, as the invention applies to both.

In shops doing much threading, a convenient way to store these tools is to nest the tap and die holders together in pairs for each size thread.

Figure 2:
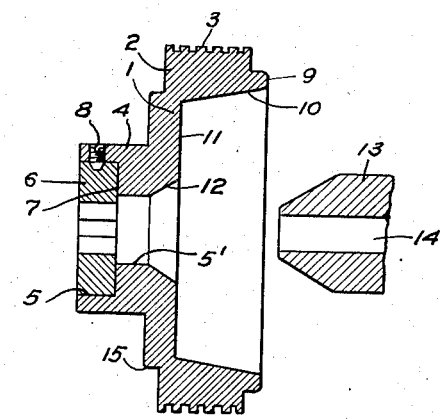
Figure 2 is a substantially full size longitudinal cross section of the wrench and its die, and showing an adjacent hollow lathe center.

For ordinary threading and tapping with small dies and taps, the device of Figure 1 or 2 is simply held and turned by a grip on the hand wheel rim, the relatively large diameter of the rim serving as an effective right angle guide to the axis of the thread being cut.

I claim:

1. A threading die holder comprising a hand wheel provided with a hub on one side formed to receive the die and provided with means for securing the same in place, the opposite side of said hand wheel formed with a recess adapted to nest over the hubbed side of the hand wheel when a plurality of the devices are stacked.

2. A threading die holder including a relatively large cylindrical body portion having a knurled band extending around its periphery, a relatively small hub projecting from the forward end of said body axially thereof, said body having a circular recess extending from the rear end of the body forwardly and terminating in a plane surface, said body further having a bore axial of the hub and extending from the recess to open through the forward end of the hub, the bore having its rear end of frusto-conical form with the apical angle of the cone equalling the standard angle for lathe centers.

CHARLES W. WEST.